(12) United States Patent
Tsuchiya (10) Patent No.: US 7,450,202 B2
(45) Date of Patent: Nov. 11, 2008

(54) LIQUID CRYSTAL DISPLAY DEVICE WITH PLURALITY OF INTERCONNECTED ISLAND SHAPED PIXEL PORTIONS FORMING PIXEL ELECTRODES WHERE SCANNING LINE OVERLAPS AN INTERCONNECTED PORTION

(75) Inventor: Hitoshi Tsuchiya, Nagano (JP)

(73) Assignee: Seiko Epson Corporation (JP)

( * ) Notice: Subject to any disclaimer, the term of this patent is extended or adjusted under 35 U.S.C. 154(b) by 442 days.

(21) Appl. No.: 11/205,172

(22) Filed: Aug. 16, 2005

(65) Prior Publication Data
US 2006/0050210 A1 Mar. 9, 2006

(30) Foreign Application Priority Data
Sep. 3, 2004 (JP) ............................. 2004-256810

(51) Int. Cl.
*G02F 1/1335* (2006.01)
(52) U.S. Cl. ...................................... 349/114; 349/146
(58) Field of Classification Search .................. 349/114
See application file for complete search history.

(56) References Cited

U.S. PATENT DOCUMENTS

2002/0036744 A1* 3/2002 Kubo et al. ................. 349/144
2004/0090410 A1* 5/2004 Ohmuro et al. ............... 345/92

FOREIGN PATENT DOCUMENTS

| JP | 11-242226 | 9/1999 |
| JP | 2002-350853 | 12/2002 |
| JP | 2003-172946 | 6/2003 |
| JP | 2004-157336 | 6/2004 |
| JP | 2004-280113 | 10/2004 |

OTHER PUBLICATIONS

M. Jisaki, H. Yamaguchi, "Development of transflective LCD for high contrast and wide viewing angle by using homeotropic alignment", Asia Display/ IDW '01, p. 133-136.

\* cited by examiner

*Primary Examiner*—David C. Nelms
*Assistant Examiner*—John Heyman
(74) *Attorney, Agent, or Firm*—Harness, Dickey & Pierce, P.L.C.

(57) ABSTRACT

A liquid crystal display device includes an element substrate; a counter substrate opposite to the element substrate; a liquid crystal layer that is formed between the element substrate and the counter substrate; and dot sections each having a transmissive display section for performing transmissive display and a reflective display section for performing reflective display. The element substrate includes switching elements, an insulating film formed on the switching elements, and pixel electrodes formed on the insulating film. The switching elements are electrically connected to the pixel electrodes through contact holes that are formed in the insulating film. Each of the pixel electrodes has a transparent electrode portion for the transmissive display and a reflective electrode portion for the reflective display. The switching element is arranged below the reflective electrode portion of a second dot section adjacent to a first dot section that is driven by the switching element.

3 Claims, 6 Drawing Sheets

LIQUID CRYSTAL DISPLAY DEVICE WITH PLURALITY OF INTERCONNECTED ISLAND SHAPED PIXEL PORTIONS FORMING PIXEL ELECTRODES WHERE SCANNING LINE OVERLAPS AN INTERCONNECTED PORTION

RELATED APPLICATION

This application claims priority to Japanese Patent Application No. 2004-256810 filed Sept. 3, 2004 which is hereby expressly incorporated by reference herein in its entirety.

BACKGROUND OF THE INVENTION

1. Technical Field

The present invention relates to a transflective liquid crystal display device in which one dot region includes a reflective display region and a transmissive display region and to an electronic apparatus including the same.

2. Related Art

Transflective liquid crystal display devices having both a reflective mode and a transmissive mode have been generally known as liquid crystal display devices. As the transflective liquid crystal display device, a display device has been suggested in which a liquid crystal layer is interposed between an upper substrate and a lower substrate, and a reflective film obtained by forming light-transmissive windows in a metal film made of, for example, Al is provided on an inner surface of the lower substrate to function as a transflective plate. In this case, in the reflective mode, external light incident on the upper substrate passes through the liquid crystal layer and is then reflected from the reflective film on the inner surface of the lower substrate. Then, the reflected light passes through the liquid crystal layer again to be emitted from the upper substrate, thereby contributing to display. On the other hand, in the transmissive mode, light emitted from a backlight to the lower substrate passes through the liquid crystal layer via the windows of the reflective film, and is then emitted from the upper substrate to the outside, thereby contributing to display. Therefore, in the region where the reflective film is formed, a portion thereof where the window is formed serves as a transmissive display region, and the other portion serves as a reflective display region.

However, this type of transflective liquid crystal display device has a problem in that a viewing angle is narrow in the transmissive display. The reason is that, since the transflective plate is provided on an inner surface of a liquid crystal cell to prevent the occurrence of parallax, reflective display should be performed by using only one polarizing plate provided on an observer side, which results in a low degree of flexibility in the optical design. Therefore, in order to solve this problem, the inventors, M. Jisaki et al., have proposed a liquid crystal display device using vertical-alignment-type liquid crystal, as disclosed in "Development of transflective LCD for high contrast and wide viewing angle by using homeotropic alignment," M. Jisaki et al., Asia Display/ID W'01, pp. 133 to 136 (2001). The liquid crystal display device has the following three features:

(1) A 'VA (vertical alignment) mode' is used in which liquid crystal molecules having negative dielectric anisotropy are vertically aligned with respect to substrates in an initial state, and are then inclined when a voltage is applied;

(2) A 'multi-gap structure' is used in which the thickness (cell gap) of a liquid crystal layer in a transmissive display region is different from that in a reflective display region; and (3) An 'alignment dividing structure' is used in which each transmissive display region is formed in the shape of a regular octagon, and a projection is provided at the center of the transmissive display region on a counter substrate to make the liquid crystal molecules incline in all directions in the transmissive display region.

In a transflective liquid crystal display device disclosed in Japanese Unexamined Patent Application Publication No. 11-242226, for example, a switching element is formed below a reflective film, and a contact hole reaching a pixel electrode is formed in a reflective display region. However, it is difficult to form both the switching element and the contact hole below the reflective film as the structure becomes more complicated, which results in a reduction in aperture ratio. In addition, the contact hole is formed by a photolithography technique. In this case, a tapered region may be formed in the vicinity of the contract hole due to side etching at the time of development or according to the accuracy of exposure. The tapered region causes alignment disorder of liquid crystal and low contrast. In particular, when liquid crystal is in a vertical alignment mode, the liquid crystal is randomly inclined due to the alignment disorder, and a discontinuous line, called disclination, appears at boundaries with other liquid crystal alignment regions, which causes, for example, residual images. In addition, since the liquid crystal alignment regions have different viewing angle characteristics, they appear as a spotted pattern when viewing the liquid crystal display device in an oblique direction.

SUMMARY

An advantage of the invention is that it provides a transflective liquid crystal display device capable of ensuring a sufficient space for the layout below a reflective film even if the structure is complicated, while maintaining a high aperture ratio, and of preventing alignment disorder caused by contact holes.

According to an aspect of the invention, a liquid crystal display device includes an element substrate, a counter substrate, a liquid crystal layer, first and second dot sections, an insulating film, and a switching element. Each of the dot sections includes a pixel electrode with a transmissive display portion where transmissive display of the dot section is performed and a reflective display portion where reflective display of the dot section is performed. The insulating film is disposed between the liquid crystal layer on one side and the first and second pixel electrodes on the other. The switching element is disposed between the liquid crystal layer and the insulating film and electrically connected to the first pixel electrode through a contact hole in the insulating film. The switching element is located at a position that overlaps the reflective display portion of the second pixel electrode in plan view.

According to this structure, since the switching element is provided in a different dot region, a sufficient space for the layout is ensured below the reflective electrode portion, and thus the degree of flexibility of the design of the dot region is improved. Accordingly, although the structure becomes complicated, an aperture ratio is not reduced. In addition, since the switching element and the contact hole are arranged in different dot regions, the contact hole can be provided closer to the edge of the dot region, which makes it possible to reduce the effects of alignment disorder on liquid crystal due to the contact hole.

Further, in the above-mentioned structure, it is preferable that the contact hole be provided at an edge portion of the pixel electrode, particularly, at a corner of the pixel electrode.

According to this structure, it is possible to reduce the effects of alignment disorder due to the contact hole to the minimum.

Furthermore, in the above-mentioned structure, it is preferable that the element substrate further include electrode lines connected to the switching elements, and that each electrode lines be arranged below the reflective electrode portion of the second dot region.

According to this structure, it is possible to a liquid crystal display device having a high aperture ratio.

Moreover, in the above-mentioned structure, it is preferable that the liquid crystal layer be composed of liquid crystal that is vertically aligned in an initial stage and that has negative dielectric anisotropy, and that each pixel electrode include a plurality of island-shaped portions and connecting portions for electrically connecting the island-shaped portions. In addition, preferably, the element substrate further includes electrode lines connected to the switching elements, and the electrode lines are arranged so as to overlap the connecting portions between the island-shaped portions in plan view.

According to this structure, it is possible to reduce the parasitic capacitance between the electrode line and the pixel electrode to the minimum. In addition, since the electrode line is arranged in a region where the connecting portion is formed, it is possible to prevent a reduction in an aperture ratio to the minimum.

According to another aspect of the invention, an electronic apparatus includes the above-mentioned liquid crystal display device.

According to this structure, it is possible to provide an electronic apparatus including a display unit capable of displaying images with high brightness and contrast.

BRIEF DESCRIPTION OF THE DRAWINGS

The invention will be described with reference to the accompanying drawings, wherein like numbers reference like elements, and wherein.

DESCRIPTION OF THE EMBODIMENTS

Hereinafter, preferred embodiments of the invention will be described with reference to the accompanying drawings. In each drawing, the scale of each layer or member is adjusted in order to have a recognizable size.

First Embodiment

Liquid Crystal Display Device

Figure 1:
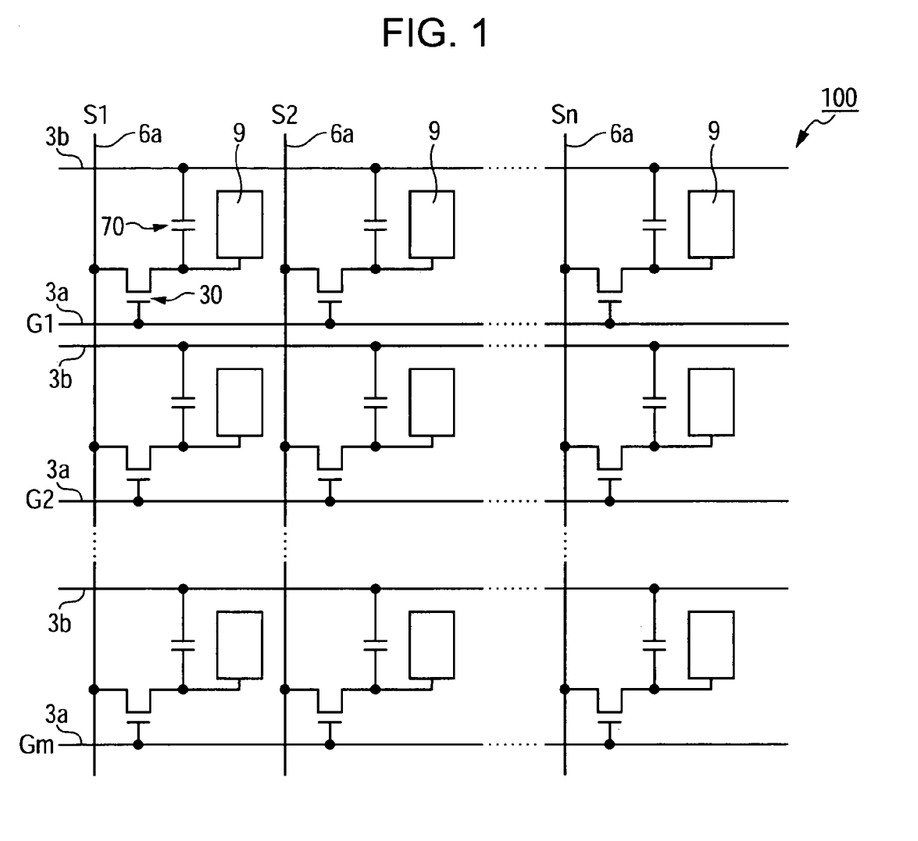
FIG. 1 is a circuit diagram of a liquid crystal display device according to a first embodiment of the invention.
Figure 2:
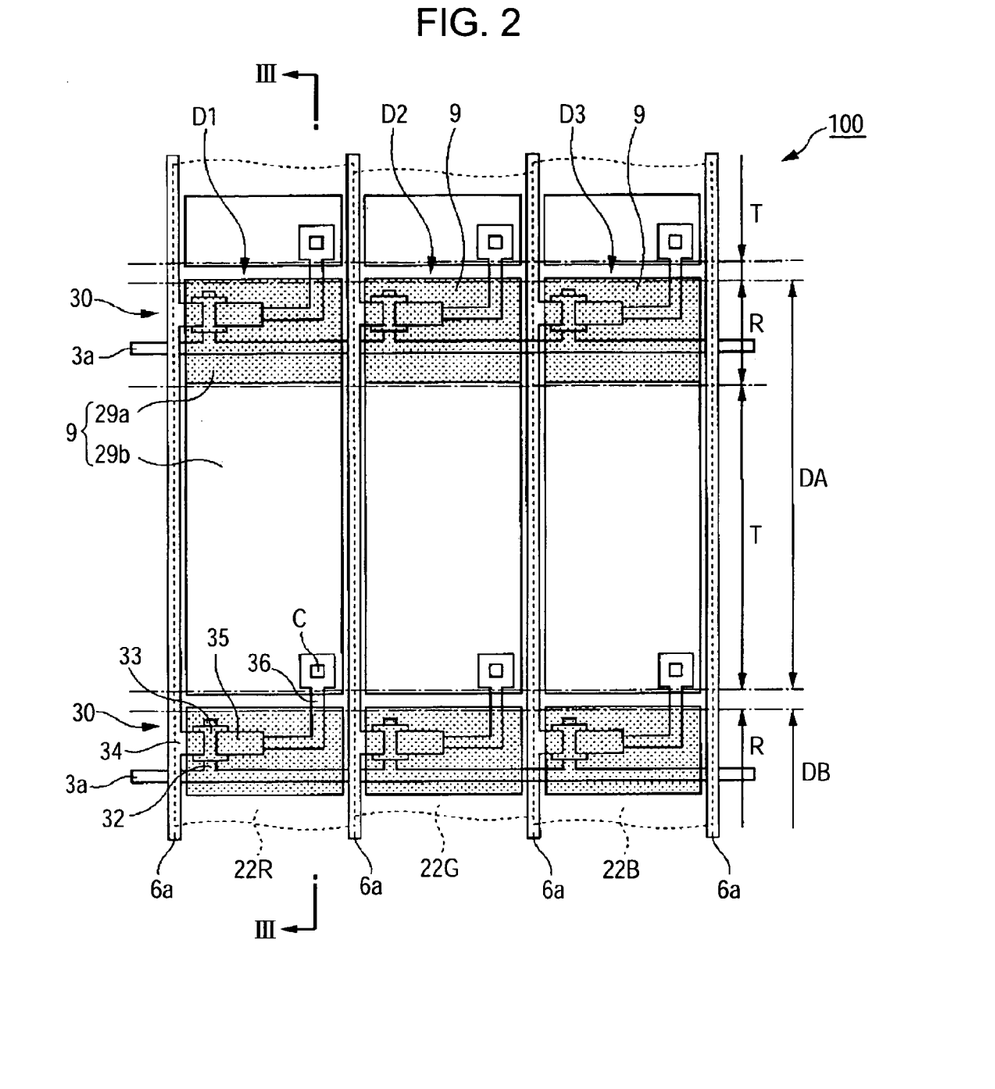
FIG. 2 is a plan view illustrating the structure of one pixel region of the liquid crystal display device.
Figure 3:
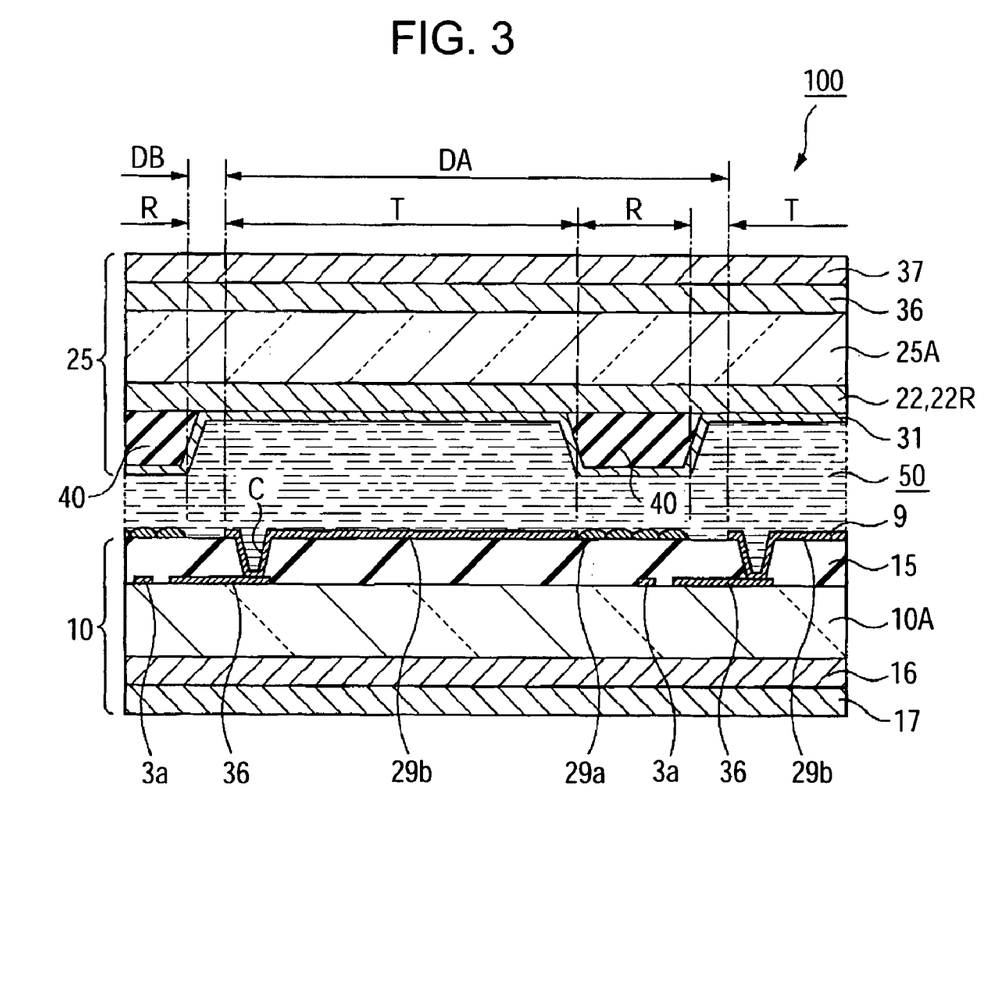
FIG. 3 is a cross-sectional view taken along the line III-III of FIG. 2.

FIG. 1 is an equivalent circuit diagram of a plurality of dots arranged in a matrix that constitute an image display region of a liquid crystal display device according to a first embodiment of the invention, and FIG. 2 is a plan view illustrating the structure of a pixel region of the liquid crystal display device of the first embodiment. FIG. 3 is a partially cross-sectional view illustrating the structure of the liquid crystal display device, and is taken along the line III-III of FIG. 2.

A liquid crystal display device 100 of this embodiment is an active-matrix transflective liquid crystal device that uses thin film transistors (TFTs) as switching elements. In the liquid crystal display device 100 of this embodiment, as shown in FIG. 1, each of the plurality of dots arranged in a matrix that constitute the image display region includes a pixel electrode 9 and a TFT 30 serving as a switching element to control the pixel electrode 9. A data line 6a (electrode line) to which image signals are supplied is electrically connected to a source of the TFT 30. Image signals S1, S2, . . . , Sn to be written on the data line 6a are line-sequentially supplied in this order, or they are supplied to adjacent data lines 6a constituting each group. In addition, a scanning line (electrode line) 3a is electrically connected to a gate of the TFT 30, and scanning signals G1, G2, . . . , Gm are line-sequentially applied to a plurality of scanning lines 3a with pulses at a predetermined timing. The pixel electrode 9 is electrically connected to a drain of the TFT element 30, and the TFT 30, serving as a switching element, is maintained in an on state for a predetermined period of time to cause the image signals S1, S2, . . . , Sn supplied from the data line 6a to be written at a given timing.

The image signals S1, S2, . . . , Sn with predetermined levels, which are written onto liquid crystal through the pixel electrodes 9, are held between the pixel electrodes 9 and a common electrode, which will be described later, for a predetermined period of time. The alignment and order of liquid crystal molecules are changed depending on the level of the applied voltage, which causes light to be modulated, thereby performing gray-scale display. In order to prevent the leakage of the held image signals, a storage capacitor 70 is additionally provided in parallel to a liquid crystal capacitor that is formed between the pixel electrode 9 and the common electrode. Reference numeral 3b denotes a capacitor line.

Next, the structure of each pixel of the liquid crystal display device 100 according to this embodiment will be described with reference to FIG. 2. As shown in FIG. 2, the liquid crystal display device 100 according to this embodiment is provided with the scanning lines 3a extending parallel to each other, the data lines 6a extending orthogonal to the scanning lines 3a, and dot regions D1 to D3 that have rectangular shapes in plan view and are provided corresponding to intersections of the scanning lines 3a and the data lines 6a. In addition, a color filter (colored layer) having any one of the three primary colors is formed corresponding to one dot region, so that three color filters 22R, 22G, and 22B corresponding to the three dot regions D1 to D3 constitute one pixel region. Further, these color filters 22R, 22G, and 22B are formed in stripe shapes extending in the vertical direction of FIG. 2 so as to be laid across the plurality of dot regions in the extending direction, respectively, and are periodically arranged in the horizontal direction of FIG. 2.

Each of the pixel electrodes 9 provided in the dot regions D1 to D3 includes a reflective electrode portion 29a for performing reflective display and a transparent electrode portion 29b for performing transmissive display. The reflective electrode portion 29a located at the upper side of FIG. 2 is composed of a laminated film of a reflective metal film made of, for example, Al (aluminum) or Ag (silver), or an alloy film thereof and a conductive film made of a transparent material, such as ITO (indium tin oxide), and a region in which the reflective electrode portion 29a is formed serves as a reflective display region R. This reflective electrode portion 29a has unevenness on a surface thereof, and the unevenness causes reflected light to be scattered, which makes it possible to perform display with a high degree of visibility. In addition, the transparent electrode portion 29b located at the lower side of FIG. 2 is composed of a conductive film made of a transparent material, such as ITO (indium tin oxide), and a region in which the transparent electrode portion 29b is formed serves as a transmissive display region T. That is, the liquid crystal display device 100 of this embodiment is a transflective liquid crystal display device in which one dot region includes the reflective display region R for performing reflective display and the transmissive display region T for performing transmissive display. In addition, a portion of each dot region located at the upper side of FIG. 2 contributes to reflective display, and the other portion thereof located at the lower side contributes to transmissive display. In FIG. 2, boundaries between the reflective display regions R and the transmissive display regions T are represented by a one-dot chain line. Further, the reflective electrode portion 29a and the transparent electrode portion 29b are formed substantially in rectangular shapes in plan view, and the electrode portions 29a and 29b are connected to each other by overlapping edge portions thereof facing each other.

The TFT 30 is provided among the scanning line 3a, the data line 6a, and the transparent electrode portion 29b located at the lower side of FIG. 2. The TFT 30 includes a semiconductor layer 33, a gate electrode portion 32 provided below the semiconductor layer 33 (on the side of a substrate body 10A), a source electrode portion 34 provided above the semiconductor layer 33, and a drain electrode portion 35. A channel region of the TFT 30 is formed in a region opposite to the gate electrode portion 32 of the semiconductor layer 33, and source and drain regions thereof are formed at both sides of the channel region on the semiconductor layer.

The gate electrode portion 32 is formed by branching a portion of the scanning line 3a in the extending direction of the data line 6a, and is opposite to the semiconductor layer 33 at its leading end, with an insulating film (not shown) interposed therebetween. The source electrode portion 34 is formed by branching a portion of the data line 6a in the extending direction of the scanning line 3a, and is electrically connected to the source region of the semiconductor layer 33 through a contact hole (not shown). One end of a drain electrode 35 is electrically connected to the drain region through a contact hole (not shown), and the other end of the drain electrode 35 is electrically connected to the pixel electrode 9 directly or through a contact hole C. In this embodiment, the scanning line 3a and the TFT 30 are formed at positions deviating from the corresponding pixel electrode 9 in plan view. That is, the scanning line 3a and the TFT 30 connected to the pixel electrode 9 in a dot region DA are arranged below the reflective electrode portion 29a of a dot region DB that is arranged in the next stage of the dot region DA, and the drain region of the TFT 30 is connected to an end of the pixel electrode 9 of the dot region DA through a lead line 36 extending from the drain region to the dot region DA. In addition, the TFT 30 is arranged in the dot region DB provided in the next stage of the dot region DA, which makes it possible to provide the contact hole C at an arbitrary position in the dot region. Therefore, in this embodiment, in order to reduce the effects of the alignment disorder of liquid crystal to a minimum, the contact hole C is formed at the edge of the pixel electrode 9, particularly, at a corner of the transparent electrode portion 29b.

Further, the TFT 30 is maintained in an on state for a predetermined period of time by gate signals input through the scanning line 3a, so that the image signals supplied through the data line 6a are written onto liquid crystal at a predetermined timing.

Meanwhile, in the plan-view structure shown in FIG. 3, the liquid crystal display device 100 includes an element substrate 10 and a counter substrate 25 arranged opposite thereto, and a liquid crystal layer 50 composed of liquid crystal that has positive dielectric anisotropy and is horizontally aligned in an initial state with a twisted angle of 0° (homogeneous alignment) is interposed between the substrates 10 and 25. The twist angle of the liquid crystal can be set in a range of 0° to 70°. In this range, it is possible to obtain high-quality display both in reflective display and in transmissive display. In addition, a backlight (not shown) having a light source, serving as an illuminating unit, a reflector, an optical waveguide, etc., is provided on an outer side of a liquid crystal cell opposite to an outer surface of the element substrate 10.

The element substrate 10 includes, as a base substrate, the substrate body 10A made of a transmissive material, such as quartz or glass. The scanning lines 3a are formed on an inner surface (a surface facing the liquid crystal layer) of the substrate body 10A. A gate insulating film (not shown) is formed so as to cover the scanning lines 3a, and the lead lines 36, the data lines 6a, etc., are formed on the gate insulating film (see FIG. 2). In addition, an interlayer insulating film (insulating film) 15 is formed so as to cover data lines 6a, etc. Then, the pixel electrodes 9 are formed thereon. As described above, the pixel electrode 9 is composed of the reflective electrode portion 29a made of, for example, Al, and the transparent electrode portion 29b made of, for example, ITO. The transparent electrode portion 29b is connected to the lead line 36 through the contact hole C formed in the interlayer insulating film 15. The TFT 30 and the scanning line 3a connected to each other through the lead line 36 are arranged below the reflective electrode portion 29a of the dot region DB provided in the next stage of the dot region DA related to the corresponding pixel electrode. That is, a portion of the lead line 36, the TFT 30, and the scanning line 3a through which signals are supplied to the dot region DA are arranged so as to overlap the reflective electrode portion 29a of the dot region DB in plan view, which makes it possible to prevent a reduction in the aperture ratio.

Although not shown, an alignment film made of, for example, polyimide is formed to cover the pixel electrodes 9 and the interlayer insulating film 15, so that the liquid crystal molecules are horizontally aligned with respect to the substrate in their initial states. A retardation plate 16 and a polarizing plate 17 are provided on the outer surface of the substrate body 10A.

The counter substrate 25 includes, as a base substrate, a substrate body 25A made of a transmissive material, such as quartz or glass. Color filters 22 (color filter layers) are formed on an inner surface of the substrate body 25 so as to be laid across the reflective display regions R and the transmissive display regions T. The color filters 22 are composed of plural types of color filters (colored layers) 22R, 22G, and 22B having different colors, and a light-shielding layer (black matrix) made of a black resin is formed among the respective color filters 22R, 22G, and 22B constituting the color filters 22, if necessary.

The insulating film 40 is selectively formed on the inner surfaces of the color filters 22, corresponding to the reflective display regions R. Since the insulating film 40 is partially formed in the dot regions, the thicknesses of the liquid crystal layer 50 are different from each other in the reflective display region R and the transmissive display region T. The insulating film 40 is made of an organic material, such as acrylic resin.

The insulating film 40 is formed with, for example, a thickness of about 2 μm±1 μm, and the thickness of the liquid crystal layer 50 in a region where the insulating film 40 is not provided is about 2 to 6 μm. The thickness of the liquid crystal layer 50 in the reflective display region R is half that of the liquid crystal layer 50 in the transmissive display region T. That is, the insulating film 40 functions as a liquid-crystal-layer-thickness adjusting layer to cause the thicknesses of the liquid crystal layer 50 to be different from each other in the reflective display region R and the transmissive display region T, thereby realizing a multi-gap structure. In this way, the liquid crystal display device 100 of this embodiment can achieve bright, high-contrast display. In addition, an inclined surface in which the thickness of the insulating film 40 is continuously varied is formed around the boundary between the reflective display region R and the transmissive display region T. Further, the inclined surface substantially overlaps an edge portion of the reflective electrode 29a at the center of the dot region in plan view.

Further, a counter electrode 31 is formed on the inner surface of the substrate body 25A so as to cover the color filters 22 and the insulating film 40. The counter electrode 31 is a conductive film made of a transparent material, such as ITO. Although not shown, an alignment film made of, for example, polyimide is formed so as to cover the counter electrode 31 to cause the liquid crystal molecules to be horizontally aligned with respect to the substrates in their initial states.

A retardation plate 36 and a polarizing plate 37 are formed on the outer surface of the substrate body 25A in this order. The polarizing plates 17 and 37 transmit only linearly polarized light oscillating in a specific direction. In addition, quarter-wave plates for delaying the wavelength of visible rays by about a quarter are used as the retardation plates 16 and 36. The transmission axes of the polarizing plates 17 and 37 are arranged at an angle of about 45° with respect to the slow axes of the retardation plates 16 and 36, and thus the polarizing plates 17 and 37 and the retardation plates 16 and 36 function as a circularly polarizing plate. This circularly polarizing plate can convert linearly polarized light into circularly polarized light, or vice versa. The circularly polarizing plate is generally formed by a combination of a polarizing plate and a quarter-wave plate. However, the circularly polarizing plate (broadband circularly polarizing plate) may be formed by a combination of polarizing plate, a half-wave plate, and a quarter-wave plate, which makes it possible to perform black display with an achromatic color.

As described above, since the liquid crystal display device 100 of this embodiment adopts a multi-gap structure in which the insulating film 40 for adjusting the thickness of the liquid crystal layer is partially provided in the dot regions, it is possible to make the retardation of the liquid crystal layer 50 in the transmissive display region T coincide with that in the reflective display region R, which enables high-contrast display both in reflective display and in transmissive display.

Further, in this embodiment, since the TFT 30 for driving the pixel electrode 9 (the dot region DA) is arranged in a dot region other than the dot region DA (the dot region DB adjacent to the dot region DA), a sufficient space for the layout is secured below the reflective electrode portion 29a. Therefore, the degree of flexibility of the design of the dot region is improved, and the aperture ratio is not reduced, even though the structure becomes complicated. In addition, since the TFT 30 and the contact hole C are arranged in different dot regions, it is possible to arrange the contact hole C closer to the edge of the dot region, compared to the related art, which makes it possible to reduce the effects of the alignment disorder of liquid crystal caused by the contact hole C. That is, although the alignment disorder of liquid crystal occurs in the contact hole C due to unevenness in the related art, in the liquid crystal display device 100 of this embodiment, since the contact hole C is arranged closer to the edge of the pixel electrode 9, the effects of the alignment disorder are reduced to the minimum. In this case, the contact hole C of the dot region (the dot region DA) in the front stage is arranged closer to the reflective electrode portion 29a of the dot region (the dot region DB) in the latter stage, which causes the alignment disorder of liquid crystal between the dot regions to be prevented. Therefore, the alignment disorder occurring in the contact hole C does not have a direct effect on adjacent dot regions.

Second Embodiment

Liquid Crystal Display Device

Figure 4:
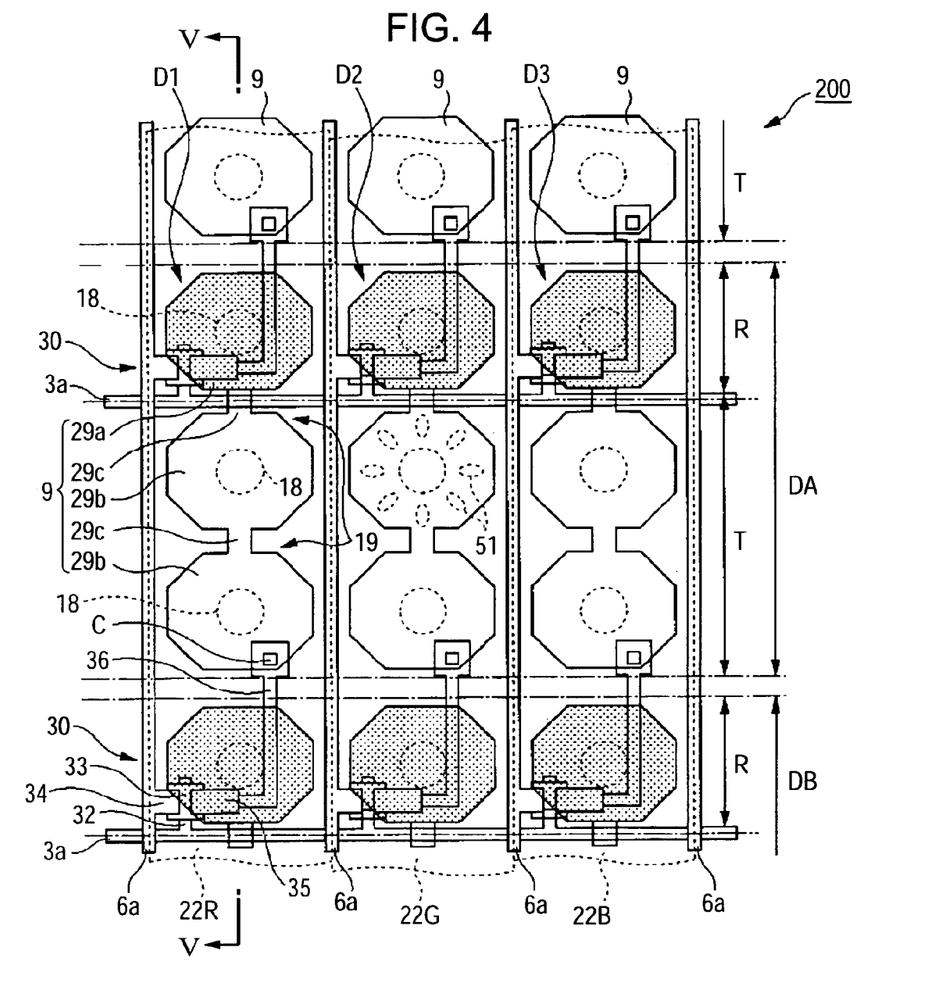
FIG. 4 is a plan view illustrating the structure of one pixel region of a liquid crystal display device according to a second embodiment of the invention.
Figure 5:
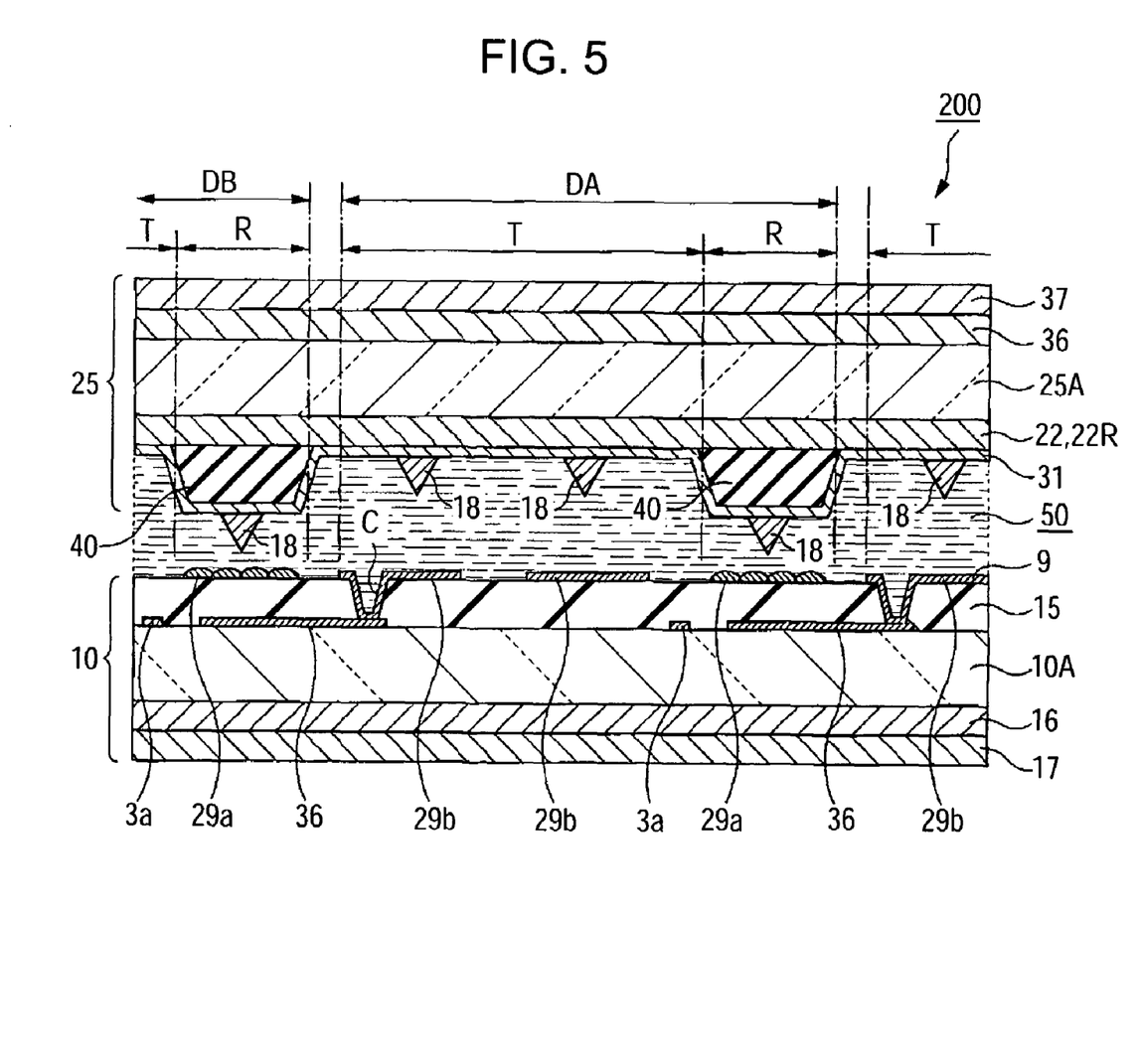
FIG. 5 is a cross-sectional view taken along the line V-V of FIG. 4.

Next, a second embodiment of the invention will be described. FIG. 4 is a plan view illustrating the structure of one pixel region of a liquid crystal display device 200 according to the second embodiment of the invention. FIG. 5 is a partially cross-sectional view illustrating the structure of the liquid crystal display device, taken along the line V-V of FIG. 4. In this embodiment, the same components as those in the first embodiment have the same reference numerals, and a description thereof will be omitted.

The second embodiment is different from the first embodiment in that a vertical alignment mode is used as a liquid crystal mode, in that the pixel electrode 9 in one dot region is divided into a plurality of island-shaped sub-pixels, and dielectric projections 18 for regulating the alignment of liquid crystal are provided on a counter substrate, corresponding to the respective sub-pixels, and in that the arrangement of the scanning lines and the pixel electrodes is changed. The other structures are the same as those in the first embodiment.

As shown in FIG. 4, in the liquid crystal display device 200 of this embodiment, each of the pixel electrodes 9 provided in dot regions D1 to D3 is divided into a plurality (in this embodiment, three) of sub-pixels (island-shaped portions) 29a and 29b by slits 19 provided in the respective dot regions, and the sub-pixels are connected to each other at the central portions (by connecting portions 29c). The sub-pixel 29a located at the upper side of FIG. 4 is composed of a laminated film of a reflective metal film made of, for example, Al (aluminum) or Ag (silver), or an alloy film thereof and a conductive film made of a transparent material, such as ITO (indium tin oxide). This sub-pixel 29a functions as a reflective electrode portion, and a region in which the sub-pixel 29a is formed serves as a reflective display region R. The reflective electrode portion has unevenness on a surface thereof, and the unevenness causes reflected light to be scattered, which makes it possible to perform display with a high degree of visibility. In addition, two sub-pixels 29b located at the lower side of FIG. 4 are composed of conductive films made of a transparent material, such as ITO (indium tin oxide). These sub-pixels 29b functions as transparent electrode portions, and a region in which the sub-pixels 29b are formed serves as a transmissive display region T. That is, the liquid crystal display device 200 of this embodiment is a transflective liquid crystal display device in which one dot region includes the reflective display region R for performing reflective display and the transmissive display region T for performing transmissive display, and in which one third of a display region contributes to reflective display and two third thereof contributes to transmissive display. In FIG. 4, boundaries between the reflective display regions R and the transmissive display regions T are represented by a one-dot chain line. Further, the connecting portions 29c between the sub-pixels are composed of conductive films made of a transparent material, such as ITO, and also contribute to the transmissive display. The dielectric projections 18, which are alignment regulating members for regulating the alignment of liquid crystal, are provided at the centers of the sub-pixels 29a and 29b, respectively. In addition, the respective sub-pixels 29a and 29b are chamfered to have substantially octagonal or circular shapes in plan view.

The TFT 30 is provided among the scanning line 3a, the data line 6a, and the sub-pixel 29b located at the lower side of FIG. 4. The TFT 30 includes a semiconductor layer 33, a gate electrode portion 32 provided below the semiconductor layer 33 (on the side of a substrate body 10A), a source electrode portion 34 provided above the semiconductor layer 33, and a drain electrode portion 35. A channel region of the TFT 30 is formed in a region opposite to the gate electrode portion 32 of the semiconductor layer 33, and source and drain regions thereof are formed at both sides of the channel region on the semiconductor layer.

The gate electrode portion 32 is formed by branching a portion of the scanning line 3a in the extending direction of the data line 6a, and is opposite to the semiconductor layer 33 at its leading end, with an insulating film (not shown) interposed therebetween. The source electrode portion 34 is formed by branching a portion of the data line 6a in the extending direction of the scanning line 3a, and is electrically connected to the source region of the semiconductor layer 33 through a contact hole (not shown). One end of a drain electrode 35 is electrically connected to the drain region through a contact hole (not shown), and the other end of the drain electrode 35 is electrically connected to the sub-pixel 29b (the pixel electrode 9) directly or through a contact hole C. In this embodiment, the scanning line 3a and the TFT 30 are formed at a position deviating from the corresponding pixel electrode 9 in plan view. That is, the TFT 30 connected to the pixel electrode 9 of a dot region DA is arranged below the sub-pixel 29a for reflective display of a dot region DB that is arranged in the next stage of the dot region DA, and the scanning line 3a connected to the TFT 30 is arranged below the connecting portion 29c of the pixel electrode 9 of the dot region DB. In addition, the drain region of the TFT 30 is connected to an end of the pixel electrode 9 of the dot region DA through a lead line 36 extending from the drain region to the dot region DA. Further, the TFT 30 is arranged in the dot region DB provided in the next stage of the dot region DA, which makes it possible to provide the contact hole C at an arbitrary position in the dot region. Therefore, in this embodiment, in order to reduce the effects of the alignment disorder of liquid crystal to a minimum, the contact hole C is formed at the end of the pixel electrode 9, particularly, at the edge of the transparent electrode portion 29b.

Further, the TFT 30 is maintained in an on state within a predetermined period of time by gate signals input through the scanning line 3a, so that image signals supplied through the data line 6a are written onto liquid crystal at a predetermined timing.

Meanwhile, in the plan-view structure shown in FIG. 5, the liquid crystal display device 200 includes an element substrate 10, a counter substrate 25 provided opposite thereto, and a liquid crystal layer 50 interposed between the substrates. The liquid crystal layer 50 is composed of liquid crystal that has negative dielectric anisotropy (where a refractive index anisotropy $\Delta n$ is, for example, 0.1) and that is vertically aligned in an initial alignment state. A backlight (not shown) having a light source, serving as an illuminating unit, a reflector, an optical waveguide, etc., is provided on an outer side of a liquid crystal cell opposite to an outer surface of the element substrate 10.

The element substrate 10 includes, as a base substrate, a substrate body 10A made of a transparent material, such as quartz or glass. The scanning lines 3a are formed on an inner surface (a surface facing the liquid crystal layer) of the substrate body 10A. A gate insulating film (not shown) is formed so as to cover the scanning lines 3a, and the lead lines 36, the data lines 6a, etc., are formed on the gate insulating film (see FIG. 4). In addition, an interlayer insulating film 15 is formed to cover the data lines 6a, etc. Then, the pixel electrodes 9 are formed thereon. As described above, the pixel electrode 9 includes the sub-pixel 29a for reflective display, made of, for example, Al, and the sub-pixels 29b for transmissive display, made of, for example, ITO. The sub-pixel 29b for transmissive display is connected to the lead line 36 through the contact hole C formed in the interlayer insulating film 15. The TFT 30 and the scanning line 3a connected to each other through the lead line 36 are arranged below the sub-pixel 29a for reflective display of the dot region DB provided in the next stage of the dot region DA related to the corresponding pixel electrode. That is, a portion of the lead line 36, the TFT 30, and the scanning line 3a for supplying signals to the dot region DA are arranged so as to overlap the sub-pixel 29a for reflective display of the dot region DB in plan view, which makes it possible to prevent a reduction in the aperture ratio.

Although not shown, an alignment film made of, for example, polyimide is formed to cover the pixel electrodes 9 and the interlayer insulating film 15, so that the liquid crystal molecules can be vertically aligned with respect to the substrate in their initial states. A retardation plate 16 and a polarizing plate 17 are provided on the outer surface of the substrate body 10A.

The counter substrate 25 includes, as a base substrate, a substrate body 25A made of a transmissive material, such as quartz or glass. Color filters (color filter layers) 22 are formed on an inner surface of the substrate body 25 so as to be laid across the reflective display regions R and the transmissive display regions T. The color filters 22 are composed of plural types of color filters (colored layers) 22R, 22G, and 22B having different colors, and a light-shielding layer (black matrix) made of a black resin is formed among the respective color filters 22R, 22G, and 22B constituting the color filters 22, if necessary.

The insulating film 40 is selectively formed on the inner surface of the color filter 22, corresponding to the reflective display region R. Since the insulating film 40 is partially formed in the dot regions, the thicknesses of the liquid crystal layer 50 are different from each other in the reflective display region R and the transmissive display region T. The insulating film 40 is made of an organic material, such as acrylic resin. The insulating film 40 is formed with, for example, a thickness of about 2 µm±1 µm, and the thickness of the liquid crystal layer 50 in a region where the insulating film 40 is not provided is about 2 to 6 µm. The thickness of the liquid crystal layer 50 in the reflective display region R is half that of the liquid crystal layer 50 in the transmissive display region T. That is, the insulating film 40 functions as a liquid-crystal-layer-thickness adjusting layer to cause the thicknesses of the liquid crystal layer 50 to be different from each other in the reflective display region R and the transmissive display region T, thereby realizing a multi-gap structure. In this way, the liquid crystal display device 200 of this embodiment can achieve bright, high-contrast display. In addition, an inclined surface in which the thickness of the insulating film 40 is continuously varied is formed around the boundary between the reflective display region R and the transmissive display region T. Also, the inclined surface substantially overlaps an edge portion of the reflective electrode 29a at the center of the dot region in plan view.

Further, a counter electrode 31 is formed on the inner surface of the substrate body 25A so as to cover the color filters 22 and the insulating film 40. The counter electrode 31 is a conductive film made of a transparent material, such as ITO, and the dielectric projections 18 that have triangular shapes in sectional view and protrude toward the liquid crystal layer 50 are provided on the counter electrode 31 at positions facing the pixel electrodes 9. The dielectric projections 18 are formed corresponding to the centers of the two sub-pixels 29b in the transmissive display region T, respectively, and one dielectric projection 18 is formed corresponding to the center of the sub-pixel 29a in the reflective display region R. Although not shown, a vertical alignment film made of, for example, polyimide is formed to cover the counter electrode 31 and the dielectric projections 18 to cause the liquid crystal molecules 51 to be vertically aligned with respect to the substrates in their initial states.

A retardation plate 36 and a polarizing plate 37 are formed on the outer surface of the substrate body 25A in this order. The polarizing plates 17 and 37 transmit only linearly polarized light oscillating in a specific direction. In addition, quarter-wave plates for delaying the wavelength of visible rays by about a quarter are used as the retardation plates 16 and 36. The transmission axes of the polarizing plates 17 and 37 are arranged at an angle of about 45° with respect to the slow axes of the retardation plates 16 and 36, and thus the polarizing plates 17 and 37 and the retardation plates 16 and 36 function as a circularly polarizing plate. This circularly polarizing plate can convert linearly polarized light into circularly polarized light, or vice versa. In addition, the polarizing plates 17 and 37 are arranged such that the transmission axes thereof are orthogonal to each other, and the retardation plates 16 and 36 are also arranged such that the slow axes thereof are orthogonal to each other. The circularly polarizing plate is generally formed by a combination of a polarizing plate and a quarter-wave plate. However, the circularly polarizing plate (broadband circularly polarizing plate) may be formed by a combination of polarizing plate, a half-wave plate, and a quarter-wave plate, which makes it possible to perform black display with an achromatic color.

Display Operation

Next, a display operation of the liquid crystal display device 200 of this embodiment will be described.

First, in a transmissive mode, light emitted from a backlight is converted into circularly polarized light by the polarizing plate 17 and the retardation plate 16, and is then incident on the liquid crystal layer 50. Since the liquid crystal molecules vertically aligned with respect to the substrates when no voltage is applied have no refractive index anisotropy, the incident light travels through the liquid crystal layer 50 in the circularly-polarized state. The incident light having passed through the retardation plate 36 is converted into linearly polarized light whose transmission axis is orthogonal to the transmission axis of the polarizing plate 37. Since the linearly polarized light does not pass through the polarizing plate 37, black display is performed in the liquid crystal display device 200 of this embodiment when no voltage is applied (normally black mode).

Meanwhile, when a voltage is applied to the liquid crystal layer 50, the liquid crystal molecules are aligned so as to be inclined with respect to the substrates, such that they have refractive index anisotropy with respect to transmission light. Therefore, the circularly polarized light incident on the liquid crystal layer 50 from the backlight is converted into elliptically polarized light while passing through the liquid crystal layer 50. Although the incident light passes through the retardation plate 36, some or all of the incident light components pass through the polarizing plate 37 without being converted into linearly polarized light whose transmission axis is orthogonal to the transmission axis of the polarizing plate 37. Therefore, in the liquid crystal display device 200 of this embodiment, white display is performed when a voltage is applied. Thus, it is possible to perform gray-scale display by adjusting the voltage applied to the liquid crystal layer 50 in the above-mentioned structure. In this case, in this embodiment, since the dielectric projections 18 are arranged corresponding to the centers of the sub-pixels 29b, respectively, the liquid crystal molecules 51 are vertically aligned with respect to outlines of the sub-pixels 29b. In addition, the liquid crystal molecules 51 are vertically aligned with respect to the inclined surfaces of the dielectric projections 18 in the vicinities of the dielectric projections 18 when no voltage is applied. On the other hand, when a voltage is applied, as shown in FIG. 4, the liquid crystal molecules 51 are inclined from the dielectric projections 18 to the outer sides thereof, so that the liquid crystal molecules 51 are aligned in the radial direction of the projections in plan view. Therefore, the liquid crystal display device 200 of this embodiment can achieve display with a wider viewing angle by allowing directors of the liquid crystal molecules 51 to be aligned in all directions when a voltage is applied. In addition, in this embodiment, since the TFT 30 for driving the pixel electrode 9 (the dot region DA) is arranged below the sub-pixel 29a for reflective display of an adjacent pixel electrode 9 (the dot region DB), it is possible to prevent a reduction in the aperture ratio although the structure becomes complicated. In addition, the alignment disorder of liquid crystal occurs in the contact hole C due to unevenness in the related art. However, in the liquid crystal display device 200 of this embodiment, since the contact hole C is arranged closer to the edge of the pixel electrode 9, the effects of the alignment disorder are reduced to the minimum. In addition, the scanning line 3a is arranged below the connecting portion 29c of the pixel electrode 9. Therefore, although parasitic capacitance is generated between the scanning line 3a and the pixel electrode 9, it is possible to reduce the effects of the parasitic capacitance on display to the minimum.

On the other hand, in a reflective mode, external light incident from the outside of the counter electrode 25 is converted into circularly polarized light while passing through the polarizing plate 37 and the retardation plate 36, and is then incident on the liquid crystal layer 50. Since the liquid crystal molecules vertically aligned with respect to the substrates when no voltage is applied have no refractive index anisotropy, the circularly polarized light travels through the liquid crystal layer 50 to the sub-pixel 29a (reflective electrode portion). Then, the light is reflected from the sub-pixel 29a to return to the liquid crystal layer 50, and is then incident on the retardation plate 36 again. At that time, since the rotation direction of the circularly polarized light reflected from the sub-pixel 29a is reversed, the light is converted into linearly polarized light whose transmission axis is orthogonal to the transmission axis of the polarizing plate 37 by the retardation plate 36. In addition, since the linearly polarized light does not pass through the polarizing plate 37, black display is performed in the liquid crystal display device 200 of this embodiment when no voltage is applied (normally black mode).

Meanwhile, when a voltage is applied to the liquid crystal layer 50, the liquid crystal molecules are aligned so as to be inclined with respect to the substrates, so that they have refractive index anisotropy with respect to transmission light. Therefore, the circularly polarized light incident on the liquid crystal layer 50 from the outer side of the counter substrate 25 is converted into linearly polarized light while passing through the liquid crystal layer 50, and then reaches the sub-pixel 29*a* (reflective electrode portion). Then, the light is reflected from the sub-pixel 29*a*, and passes through the liquid crystal layer 50 to be incident on the retardation plate 36 again. Since the reflected light is circularly polarized light having the same rotation direction as the previously incident light, it is converted into linearly polarized light whose transmission axis is parallel to the transmission axis of the polarizing plate 37 by the retardation plate 36, and then passes through the polarizing plate 37. Therefore, in the liquid crystal display device 200 of this embodiment, white display is performed when a voltage is applied. In addition, it is possible to perform gray-scale display by adjusting the voltage applied to the liquid crystal layer 50 in the above-mentioned structure. In this case, in this embodiment, since the dielectric projections 18 are arranged corresponding to the centers of the sub-pixels 29*a*, respectively, the liquid crystal molecules 51 are vertically aligned with respect to the outlines of the sub-pixels 29*a*. In addition, the liquid crystal molecules 51 are vertically aligned with respect to the inclined surfaces of the dielectric projections 18 in the vicinities of the dielectric projections 18 when no voltage is applied. On the other hand, when a voltage is applied, as shown in FIG. 4, the liquid crystal molecules 51 are inclined from the dielectric projections 18 to the outer sides thereof. That is, the liquid crystal molecules 51 are aligned in the radial direction of each dielectric projection 18 in plan view. Therefore, the liquid crystal display device 200 of this embodiment can achieve display with a wider viewing angle by allowing directors of the liquid crystal molecules 51 to be aligned in all directions when a voltage is applied. In addition, the TFT 30 for driving the pixel electrode 9 (the dot region DA) is separated from the contact hole C in plan view, and the contact hole C is arranged in the transmissive display region T. Therefore, the alignment disorder of liquid crystal due to the contact hole C does not occur in the reflective display region R. Further, in this embodiment, the contact hole C of the dot region in the front stage is arranged close to the sub-pixel 29*a* for reflective display of the dot region in the latter stage, so that the alignment disorder of liquid crystal does not occur between the dot regions. Thus, the alignment disorder of liquid crystal due to the contact hole C does not directly exert influence on adjacent dot regions.

As described above, since the liquid crystal display device 200 of this embodiment adopts a multi-gap structure, it is possible to achieve high-contrast display both in reflective display and in transmissive display. In addition, one pixel electrode 9 is divided into a plurality of sub-pixels 29*a* and 29*b*, and the dielectric projections 18 are provided correspondingly to the centers of the sub-pixels. Therefore, when a voltage is applied, the liquid crystal molecules 51 are radially aligned in the image display region, centered on the dielectric projections 18, which makes it possible to perform display with a wider viewing angle.

Further, in this embodiment, since the TFT 30 for driving the pixel electrode 9 (the dot region DA) is arranged in a dot region other than the dot region DA (a dot region DB adjacent to the dot region DA), a sufficient space for the layout is secured below the reflective electrode portion 29*a*. Therefore, the degree of flexibility of the design of the dot region is improved, and the aperture ratio is not reduced although the structure becomes complicated. In addition, since the TFT 30 and the contact hole C are arranged in different dot regions, it is possible to arrange the contact hole C closer to the edge of the dot region, compared to the related art, which makes it possible to reduce the effects of the alignment disorder of liquid crystal due to the contact hole C to the minimum.

Furthermore, in this embodiment, since the scanning line 3*a* is arranged so as to overlap the connecting portion 29*c* between the sub-pixels in plan view, it is possible to reduce the parasitic capacitance between the scanning line 3*a* and the pixel electrode 9 to the minimum. In addition, the scanning line 3*a* is provided in a region where the connecting portion 29*c* is formed, which makes it possible to reduce the effects of the scanning lines on the aperture ratio to the minimum.

Electronic Apparatus

Figure 6:
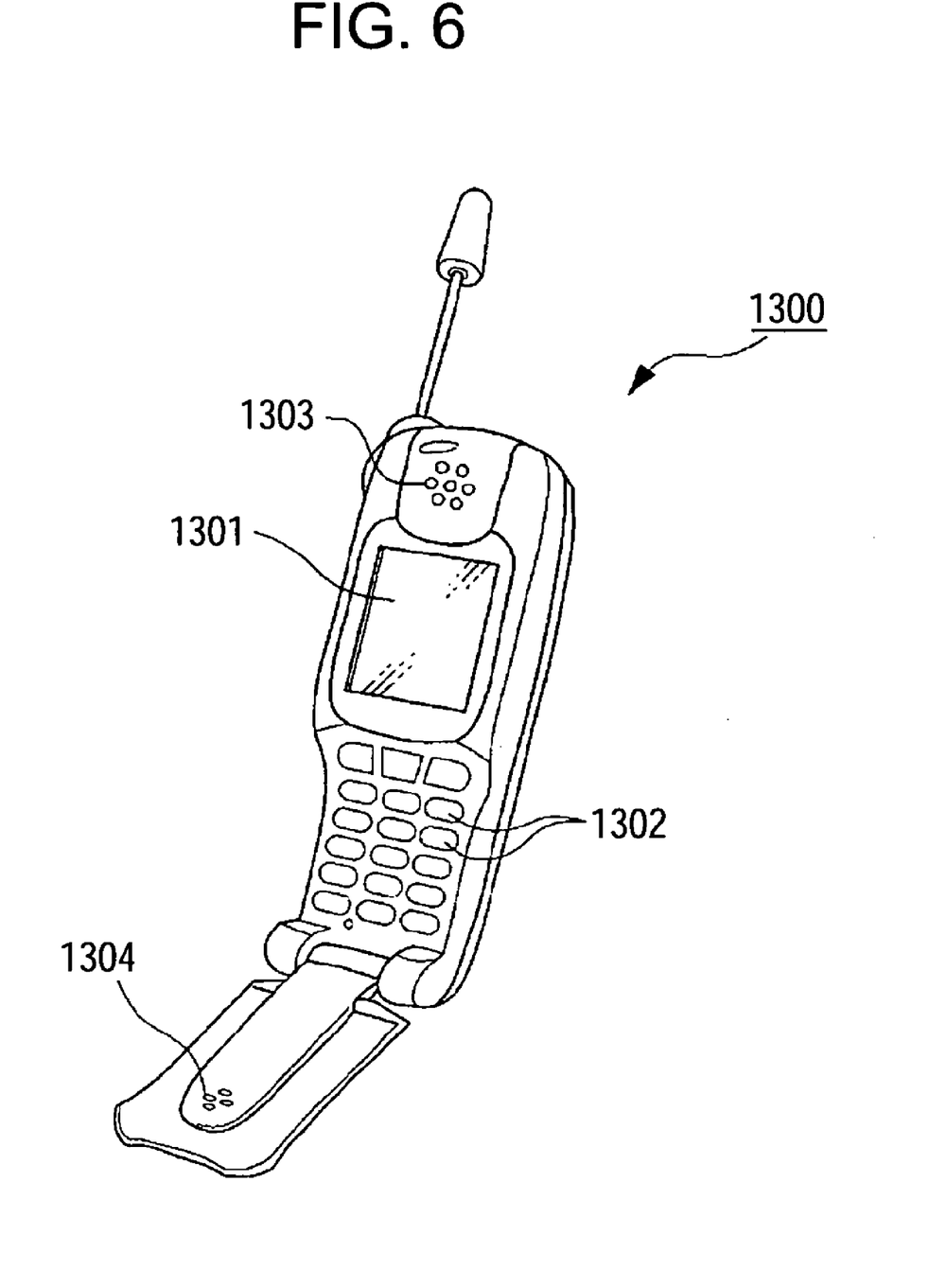
FIG. 6 is a perspective view illustrating an example of an electronic apparatus according to the invention.

FIG. 6 is a perspective view of an exemplary electronic apparatus according to the invention. A cellular phone 1300 shown in FIG. 6 includes the display device according to the invention as a small display unit 1301, a plurality of operation buttons 1302, a receiver unit 1303, and a transmitter unit 1304.

The display device according to the above-described embodiments can be applied to an electronic book, a personal computer, a digital still camera, a liquid crystal television, a view-finder-type or monitor-direct-view-type videotape recorder, a car navigation apparatus, a pager, an electronic organizer, an electronic calculator, a word processor, a workstation, a television phone, a POS terminal, apparatuses including touch panels, etc., in addition to the above-mentioned cellular phone. In this case, the electronic apparatuses all can perform bright, high-contrast transmissive/reflective display at a wider viewing angle.

Although a description has been given above of the preferred embodiments of the invention with reference to the accompanying drawings, the invention is not limited thereto. The shapes or arrangements of components and a combination thereof shown in the above-described embodiments are just illustrative examples, and can be changed or modified based on the design requirements, without departing from the scope or spirit of the invention.

For example, in the second embodiment, the reflective electrode portion 29*a* is made of a conductive material having a light-reflective property. However, all pixel electrodes 9 may be made of a conductive material, such as ITO, and a light-reflective film may be separately formed therefrom. In this case, it is necessary to provide the light-reflective film on the TFT 30 and the scanning line 3*a* (on the observer side).

Furthermore, in the above-described embodiments, the dielectric projections 18 having substantially conic shapes, serving as members for regulating the alignment of liquid crystal, are arranged at the centers of the sub-pixels 18. However, instead of them, a slit-shaped opening (electrode slit) formed by cutting out a portion of a liquid-crystal driving electrode (the pixel electrode 9 or the counter electrode 31) may be used as the alignment regulating member. The electrode silt is different from the projection in principle, but has the same effects and operations as the projection. In addition, the alignment regulating member may be composed of a combination of the electrode slit and the projection. The alignment regulating member is not necessarily formed on the same substrate as the color filter 22. That is, the alignment regulating member and the color filter 22 may be formed on different substrates.

Moreover, in the above-described embodiments, the insulating film 40 for adjusting the thickness of the liquid crystal layer is formed only in the reflective display region R, but may be formed in the transmissive display region T as well as in the reflective display region R. In this case, the thicknesses of the insulating films in the respective display regions are adjusted such that the thickness of the liquid crystal layer in the reflective display region R is smaller than that in the transmissive display region T. For example, the thickness of the insulating film in the reflective display region R is adjusted larger than that in the transmissive display region T. In addition, the insulating film 40 is not formed on only one substrate, but may be formed on both substrates.

Further, in the above-described embodiments, TFTs, which are three-terminal elements, are used as pixel driving elements. However, TFDs (thin film diodes), which are two-terminal elements, may be used instead of the TFTs.

The entire disclosure of Japanese Patent Applicatoin No. 2004-256810, filed Sep. 3, 2004, is expressly incorporated by reference herein.

What is claimed is:

1. A liquid crystal layer display device comprising:
a first dot section including a first pixel electrode with a transmissive display portion where transmissive display of the first dot section is performed and a reflective display portion where reflective display of the first dot section is performed;
a second dot section disposed adjacent to the first dot section, the second dot section including a second pixel electrode with a transmissive display portion where transmissive display of the second dot section is performed and a reflective display portion where reflective display of the second dot section is performed;
an element substrate having the first and second pixel electrodes;
a counter substrate opposite to the element substrate;
a liquid crystal layer interposed between the element substrate and the counter substrate, the liquid crystal layer including liquid crystal that has negative dielectric anisotropy;
an insulating film disposed between the element substrate and the first and second pixel electrodes, the insulating film being formed with a contact hole; and
a switching element disposed between the element substrate and the insulating film, the switching element electrically connected to the first pixel electrode through the contact hole, the switching element being located at a position that overlaps the reflective display portion of the second pixel electrode in plan view,
wherein the first and second pixel electrodes each include a plurality of island-shaped portions and a connecting portion that electrically connects the island shaped portions to each other, and further comprise an electrode line connected to the switching element, and the electrode line is disposed between the liquid crystal layer and the element substrate and is at a position that overlaps the connecting portion between the island shaped portions in plan view.

2. The liquid crystal layer display device according to claim 1, wherein the contact hole is provided at an edge portion of the first pixel electrode.

3. The liquid crystal layer display device according to claim 2, wherein the contact hole is provided at a corner of the first pixel electrode.

* * * * *